United States Patent
Ashek et al.

(10) Patent No.: US 11,166,437 B2
(45) Date of Patent: Nov. 9, 2021

(54) OVERHEAD CAMERA SYSTEM TO GAUGE LIVESTOCK DEVELOPMENT

(71) Applicant: INTERNATIONAL BUSINESS MACHINES CORPORATION, Armonk, NY (US)

(72) Inventors: Mahmood Saajan Ashek, Markham (CA); Justin Gilbert, Lanesboro, MN (US); Eric V. Kline, Rochester, MN (US); Vincenzo Di Luoffo, Sandy Hook, CT (US); Garnet Miller, Port Moody (CA); Sarbajit K. Rakshit, Kolkata (IN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 152 days.

(21) Appl. No.: 16/360,840

(22) Filed: Mar. 21, 2019

(65) Prior Publication Data
US 2020/0296935 A1   Sep. 24, 2020

(51) Int. Cl.
*G06K 9/00* (2006.01)
*A01K 29/00* (2006.01)
*G06T 7/00* (2017.01)
*H04N 5/247* (2006.01)
*H04N 5/232* (2006.01)

(52) U.S. Cl.
CPC .......... *A01K 29/005* (2013.01); *G06T 7/0012* (2013.01); *H04N 5/23296* (2013.01); *H04N 5/23299* (2018.08); *H04N 5/247* (2013.01)

(58) Field of Classification Search
CPC .. A01K 29/005; H04N 5/247; H04N 5/23299; H04N 5/23296; H04N 5/33; H04N 5/232; G06T 7/0012
USPC ................................. 382/100, 103, 110, 128
See application file for complete search history.

(56) References Cited

U.S. PATENT DOCUMENTS

2005/0257748 A1   11/2005  Kriesel et al.
2014/0193043 A1*  7/2014  Gomas ................. G06K 9/6214
                                                            382/110
2015/0359199 A1   12/2015  Schaefer et al.
(Continued)

FOREIGN PATENT DOCUMENTS

WO   2012129657 A1   10/2012

OTHER PUBLICATIONS

Anonymous, "International Space Station Agricultural Camera (ISSAC)", Online Retrieve, URL<Summaryhttps://www.nasa.gov/mission_pages/station/research/experiments/81>, 4 pages.
(Continued)

*Primary Examiner* — Andrew M Moyer
(74) *Attorney, Agent, or Firm* — Cantor Colburn LLP; Tihon Poltavets

(57) ABSTRACT

A livestock development gauging system is provided. The livestock development gauging system includes a pen, an imaging device and a processing system. The pen defines a livestock containment area. The imaging device is suspended proximate to the livestock containment area and configured to generate images of livestock in the livestock containment area. The processing system is configured to determine a livestock health measurement of the livestock based on an analysis of the images of the livestock.

8 Claims, 4 Drawing Sheets

(56) References Cited

U.S. PATENT DOCUMENTS

2015/0359200 A1* 12/2015 Cook .................. A01K 29/005
382/110
2017/0280687 A1* 10/2017 Vrabete .................. G16H 40/63

OTHER PUBLICATIONS

Anonymous, "IP Camerica Surveillance of Livestock", Online Retrieved, URL:<https://www.daera-ni.gov.uk/articles/ip-camera-surveillance-livestock>, 4 pages.

Anonymous, "Professional Development", Online Retrieve, URL:<http://www.ifaj.org/professional-development/professional-features/inthe-blink-of-an-eye-tips-for-photographing-livestock>, 2 pages.

Anonymous, "Wireless Barn Cameras from Riverwind Surveillance Supply", Online Retrieve, URL:<http://www.foalingcamera.com/?gclid=Cj0KEQiAkO7CBRDeqJ_ahuiPrtEBEiQAbYupJfUOfgfxm3ZoCd5BfEArWL56nT9lnz4RrX-OqW7kTDEaAqBc8P8HAQ>, 2 pages.

Anonymous, "Wireless camera and monitor system for agricultural or construction applications", Online Retrieve, URL: <http://www.hyndsightvision.com/agriculture>, 7 pages.

Ola Al-Ghazawy, "Computer system identifies cattle from nose prints", Online Retrieve, URL<http://www.scidev.net/global/livestock/news/computer-system-identifies-cattle-from-nose-prints.html>, 5 pages.

Al-Ghazawy, Ola "Computer system identifies cattle from nose prints", Online Retrieve, URL<http://www.scidev.net/global/livestock/news/computer-system-identifies-cattle-from-nose-prints.html>, downloaded Mar. 20, 2019; 5 pages.

Department of Agriculture, Environment and Rural Affairs, "IP Camerica Surveillance of Livestock", Online Retrieved, URL:<https://www.daera-ni.gov.uk/articles/ip-camera-surveillance-livestock>; downloaded on Dec. 18, 2020; 4 pages.

Hyndsight, "Wireless Camera and Monitor System for Agricultural or Construction Applications", Online Retrieve, URL:<http://www.hyndsightvision.com/agriculture>, dated Mar. 20, 2019; 7 pages.

Ifaj, "Professional Development", Online Retrieve, URL:<http://www.ifaj.org/professional-development/professional-features/inthe-blink-of-an-eye-tips-for-photographing-livestock>, downloaded Mar. 20, 2019; 2 pages.

NASA, "International Space Station Agricultural Camera (ISSAC)", Online Retrieve, URL<Summaryhttps://www.nasa.gov/mission_pages/station/research/experiments/81>, dated Aug. 9, 2017; 4 pages.

Riverwind Surveillance Supply, "Wireless Barn Cameras from Riverwind Surveillance Supply", Online Retrieve, URL:<http://www.foalingcamera.com/?gclid=Cj0KEQiAkO7CBRDeqJ_ahuiPrtEBEiQAbYupJfUOfgfxm3ZoCd5BfEArWL56nT9lnz4RrX-OqW7kTDEaAqBc8P8HAQ>, downloaded Mar. 20, 2019; 2 pages.

* cited by examiner

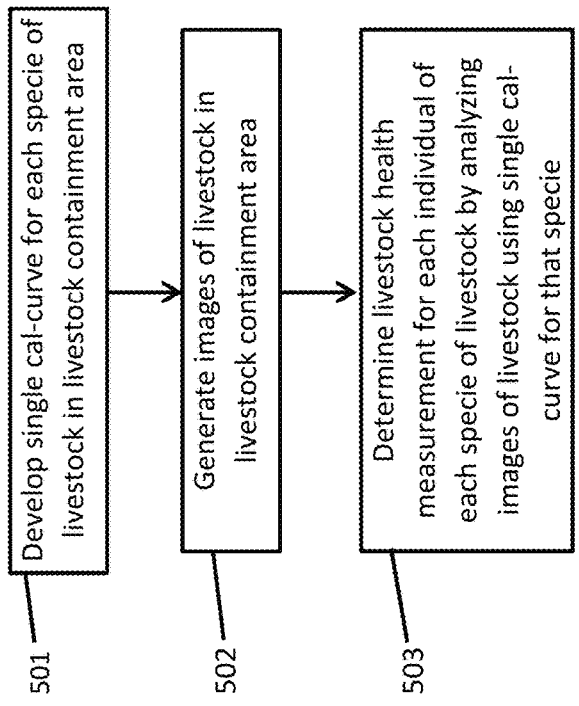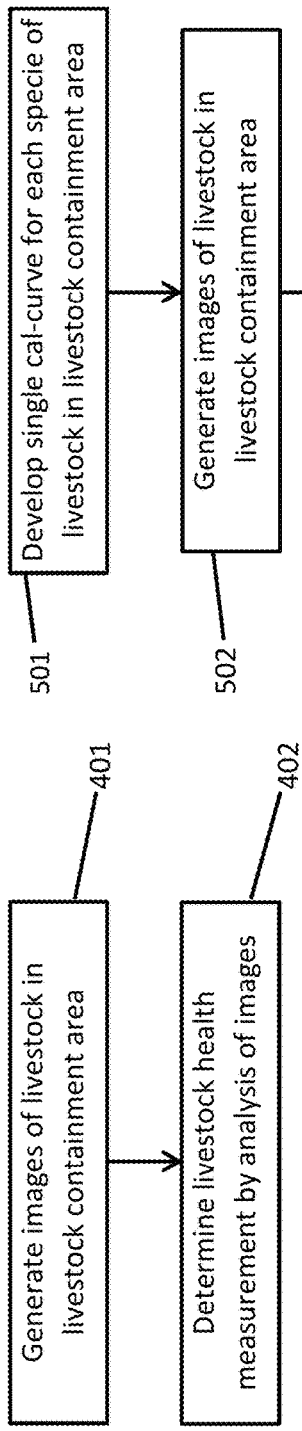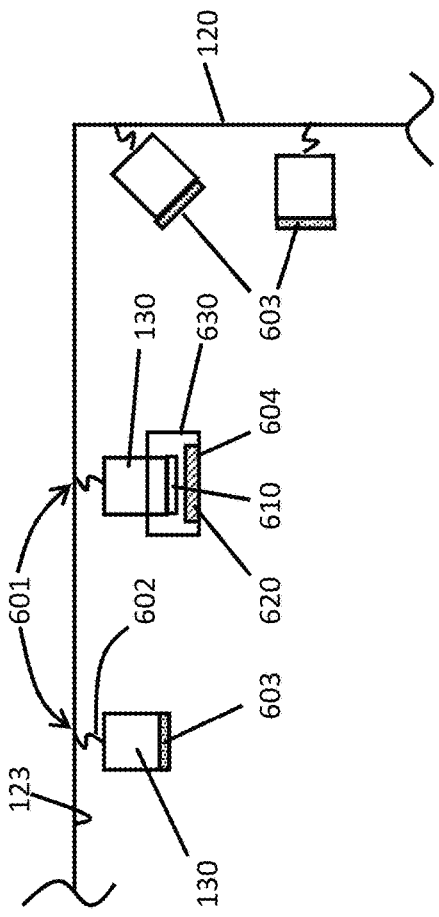

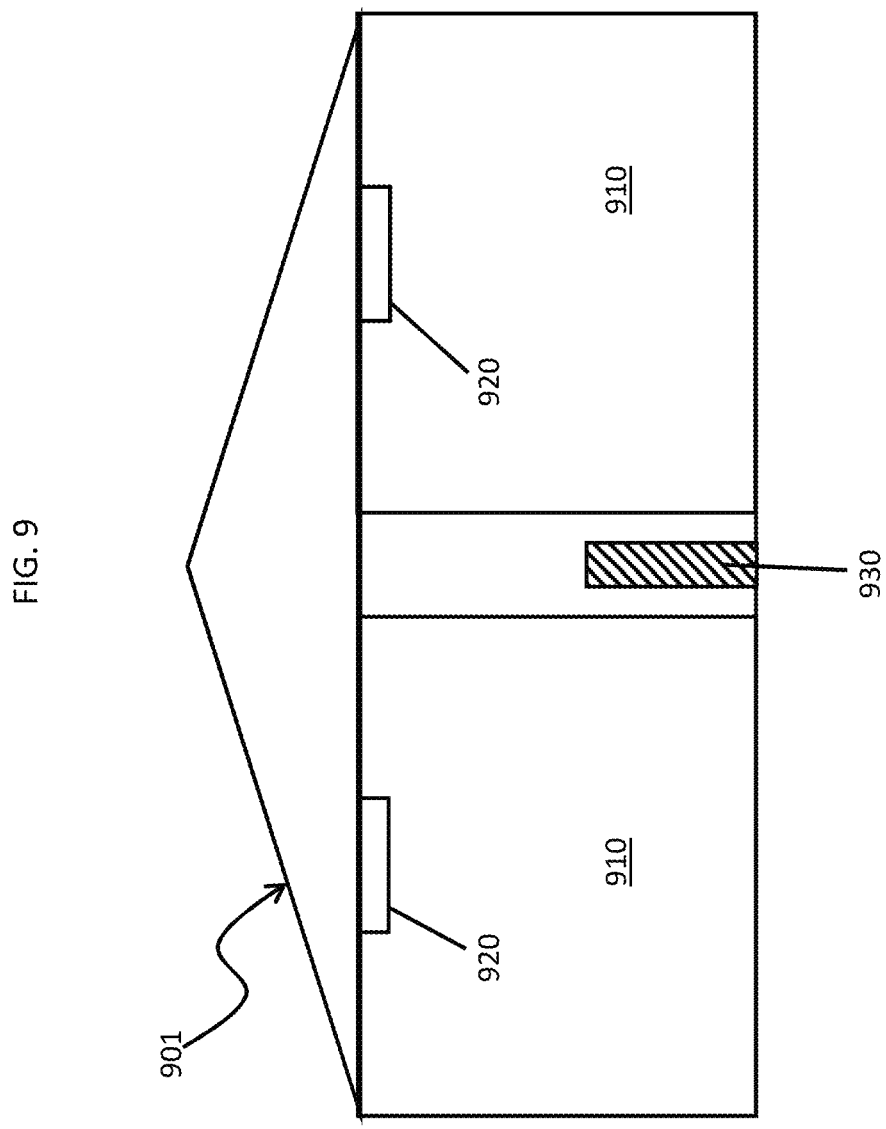

OVERHEAD CAMERA SYSTEM TO GAUGE LIVESTOCK DEVELOPMENT

BACKGROUND

The present invention generally relates to livestock development, and more specifically, to an overhead camera system to gauge livestock development.

In certain industries, such as various agrarian enterprises involved with livestock growth and development, a population of animals is kept in a pen or other enclosure for a period of time. The pen is typically four-sided, with a floor and a roof, and the animals can be held together in a crowded or uncrowded condition for extended times. Periodically, the pen can be opened to allow the animals to exit and move around. In some cases, a large barn can be provided to include multiple pens where each pen houses a different population of animals.

Where the various agrarian enterprises are involved with livestock growth and development, it is often the case that these various agrarian enterprises need to monitor livestock development in order to improve production efficiencies. This is especially true as the human population is forecast to continue to increase.

SUMMARY

Embodiments of the present invention are directed to a livestock development gauging system. A non-limiting example of the livestock development gauging system includes a pen, an imaging device, and a processing system. The pen defines a livestock containment area. The imaging device is suspended proximate to the livestock containment area and configured to generate images of livestock in the livestock containment area. The processing system is configured to determine a livestock health measurement of the livestock based on an analysis of the images of the livestock.

Embodiments of the present invention are directed to a livestock development gauging system. A non-limiting example of the livestock development gauging system includes a pen, an imaging device, and a processing system. The pen defines a livestock containment area. The imaging device is suspended proximate to the livestock containment area. The processing system is disposed locally or remotely with respect to the livestock containment area and is configured to execute at least one of a first method and a second method. The first method includes generating images of the livestock in the livestock containment area with the imaging device and determining the livestock health measurement for each individual of each species of the livestock by analyzing the images of the livestock. The second method includes developing a single calibration-curve for each species of livestock in the livestock containment area, generating images of the livestock in the livestock containment area with the imaging device and determining a livestock health measurement for each individual of each species of the livestock by analyzing the images of the livestock using the single calibration-curve developed for that species.

Embodiments of the present invention are directed to a computer-implemented method of livestock development gauging. A non-limiting example of the computer-implemented method of livestock development gauging includes at least one of first and second methods. The first method includes generating images of the livestock in the livestock containment area and determining the livestock health measurement for each individual of each species of the livestock by analyzing the images of the livestock. The second method includes developing a single calibration-curve for each species of livestock in the livestock containment area, generating images of the livestock in the livestock containment area and determining a livestock health measurement for each individual of each species of the livestock by analyzing the images of the livestock using the single calibration-curve developed for that species.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 4 is a flow diagram illustrating a method of livestock development gauging in accordance with embodiments of the present invention;

FIG. 5 is a flow diagram illustrating a method of livestock development gauging in accordance with embodiments of the present invention;

FIG. 6 is a side schematic view of components of the pen of FIGS. 1 and 2 in accordance with embodiments of the present invention;

FIG. 9 is a side view of multiple pens for containing livestock in accordance with embodiments of the present invention.

Figure 2:
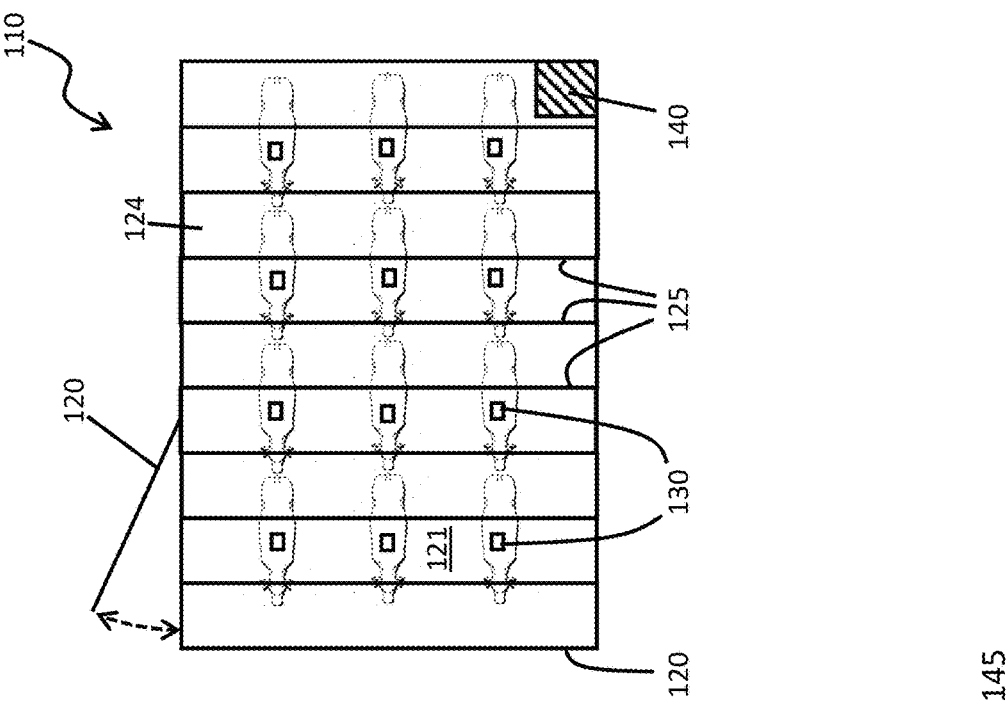
FIG. 2 is a top-down view of the pen of FIG. 1.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, a livestock pen is typically four-sided, with a floor and a roof, houses and contains animals together in crowded or uncrowded conditions for sometimes extended periods of times. Periodically, the livestock pen can be opened to allow the animals to exit and move around outside. In some cases, the livestock pen can be incorporated into a large barn that includes multiple pens where each pen houses a different population of animals.

Over time, the animals housed and contained within a livestock pen grow and either remain healthy or get sick. In any case, their growth needs to be measured periodically and their health status needs to be ascertained periodically. This can be a complicated and difficult process as each animal being measured and tested usually needs to be taken out of the livestock pen and transported to a measuring station. There are currently no methods available for conducting the measuring and testing within the livestock pen itself.

Turning now to an overview of the aspects of the invention, one or more embodiments of the invention address the above-described shortcomings of the prior art by providing a livestock development gauging system. The livestock development gauging system includes a pen, an imaging device, and a processing system. The pen defines a livestock containment area. The imaging device is suspended proximate to the livestock containment area and configured to generate images of livestock in the livestock containment area. The processing system is disposed locally or remotely with respect to the livestock containment area and is configured to determine a livestock health measurement of the livestock based on an analysis of the images of the livestock.

Figure 1:
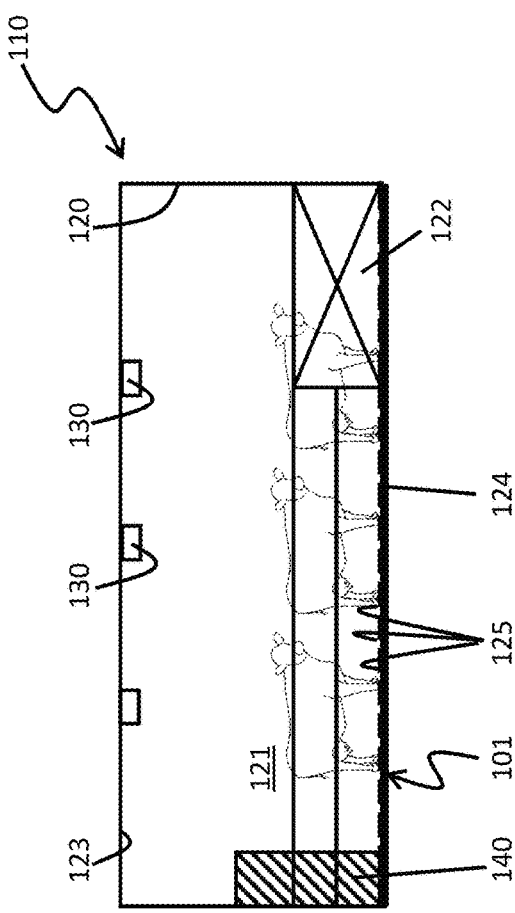
FIG. 1 is a side view of a pen for containing livestock in accordance with embodiments of the present invention.

The above-described aspects of the invention address the shortcomings of the prior art by providing for a two-dimensional gauge of livestock volume or thermal mass as a function of pen/enclosure area (e.g., livestock mass or thermal mass density) as a means to measure livestock development over time. Imaging devices, such as cameras, would be situated overhead (above the pen or other enclosure) and could be provided as optical or infrared (IR) cameras that can generate images of livestock for analysis. That is, overhead optical or IR imaging is used to gauge livestock volume or thermal mass per fixed (or variable) unit area. In addition, floor coloring or contrast enhancements can be provided for ease of gauging livestock volume Turning now to a more detailed description of aspects of the present invention, FIGS. 1 and 2 depict a livestock pen 101 for use in a livestock development gauging system 110. The livestock pen 101 includes sidewalls 120 that are formed to define a livestock containment area 121 in which one or more individual animals can be housed and contained. The livestock pen 101 further includes a doorway 122 in one or more of the sidewalls 120 that can be opened to permit ingress or egress of livestock and a ceiling 123 that is supported by the sidewalls 120 above the livestock containment area 121. In some cases, the livestock pen 101 can also include a floor 124. The following description will relate to these cases for purposes of clarity and brevity.

With the livestock pen 101 provided as shown in FIGS. 1 and 2, the livestock development gauging system 110 can further include an imaging device 130 and a processing system 140. The imaging device 130 can be provided as an optical camera or an IR camera, for example, and can be suspended proximate to the livestock containment area 121. As such, the imaging device 130 can be configured to generate images of livestock in the livestock containment area 121. The processing system 140 can be disposed locally with respect to the livestock containment area 121 or remotely with respect to the livestock containment area 121.

Figure 3:
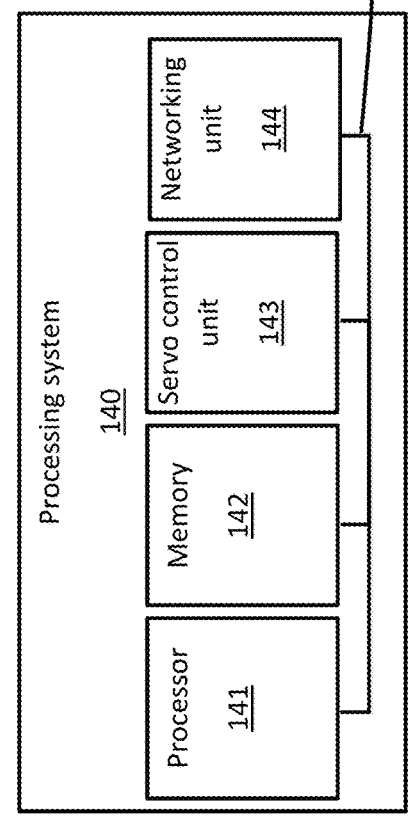
FIG. 3 is a schematic diagram of a processing system of a livestock development gauging system in accordance with embodiments of the invention.

With reference to FIG. 3, the processing system 140 can include a processor 141, a memory 142, a servo control unit 143, a networking unit 144 and an input/output (I/O) bus 145 by which the processing system 140 is communicative with the memory 142, the servo control unit 143 and the networking unit 144. The servo control unit 143 is configured to operate the imaging device 130 in accordance with commands received from the processor 141. The networking unit 144 allows for communication between the processor 141 and the imaging device 130 and for communication between the processor 141 and external computing devices. The memory 142 has executable instructions stored thereon, which are readable and executable by the processor 141.

When the executable instructions are read and executed by the processor 141, the executable instructions cause the processor 141 to operate as described herein.

In particular, with reference to FIGS. 4 and 5, when the executable instructions are read and executed by the processor 141, the executable instructions cause the processor 141 to execute at least one of first and second methods. In the former case, as shown in FIG. 4, the executable instructions cause the processor 141 to generate images of the livestock in the livestock containment area 121 (401) and to determine a livestock health measurement by analyzing the images of the livestock (402). In the latter case, as shown in FIG. 5, the executable instructions cause the processor 141 to develop a single calibration-curve for each species of livestock in the livestock containment area 121 (501), to actuate the imaging device 130 to generate images of the livestock in the livestock containment area 121 (502) and to determine a livestock health measurement for each individual of each species of the livestock by analyzing the images of the livestock using the single calibration-curve developed for that species (503).

In accordance with embodiments of the present invention and as shown in FIGS. 1 and 2, the floor 124 spans at least a portion of the livestock containment area 121. The floor 124 can be painted with a color that contrasts with a color of the livestock. The floor 124 can include fiducials 125 (e.g., markings or floor components at known intervals) that are configured to aid in the analysis of the images of the livestock.

With reference to FIG. 6, the livestock development gauging system 110 (see FIGS. 1 and 2) can further include a coupling 601 by which the imaging device 130 is suspended from the ceiling 123. This coupling 601 can include a connector 602 that is controllable by the processing system 140 to adjust at least one of a position and an orientation of the imaging device 130.

In accordance with further embodiments of the present invention and as shown in FIGS. 1 and 2, the imaging device 130 can be provided as multiple imaging devices 130. In these cases, the multiple imaging devices 130 can be arranged to cooperatively image a substantial entirety of the livestock containment area 121. In an exemplary case, the multiple imaging devices 130 can be arranged in an evenly spaced and laid out matrix.

In accordance with still further embodiments of the present invention and as shown in FIG. 6, at least a portion of the multiple imaging devices 130 can be disposed and configured to generate the images of the livestock along non-vertical points-of-view (POVs). Also, in accordance with still further embodiments of the present invention and as shown in FIG. 6, one or more of the multiple imaging devices 130 can include either a specialized lens 603 or a lens assembly 604. In the former case, fiducials configured to aid in the analysis of the images of the livestock are etched into the specialized lens 603. In the latter case, the lens assembly 604 includes a lens 610, a calibration feature 620 that includes fiducials 621 and a fastener 630. The fastener 630 fastens the calibration feature 620 to the lens 610 such that the fiducials 621 are disposed in a field-of-view (FOV) of the lens 610.

Figure 7:
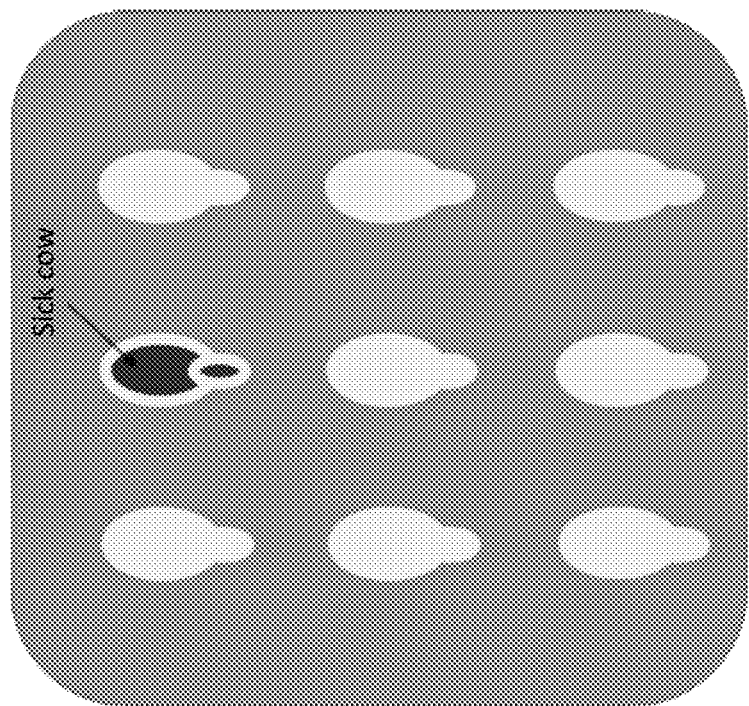
FIG. 7 is an illustration of an execution of the method of FIG. 4.

With reference to FIG. 7, an execution of the method of FIG. 4 can be accomplished in the particular embodiments of the present invention in which the imaging device(s) 130 are IR cameras. As shown in FIG. 7, the imaging devices 130 can be used to generate images of the livestock in the containment area 121 in which the coloring of the images is indicative of the body temperatures of each individual animal. Thus, an analysis of the coloring of the images can be used to determine that one or more of the individual animals has an elevated temperature and may be sick. Separation of that individual animal and therapy can then be undertaken to mitigate losses.

Figure 8:
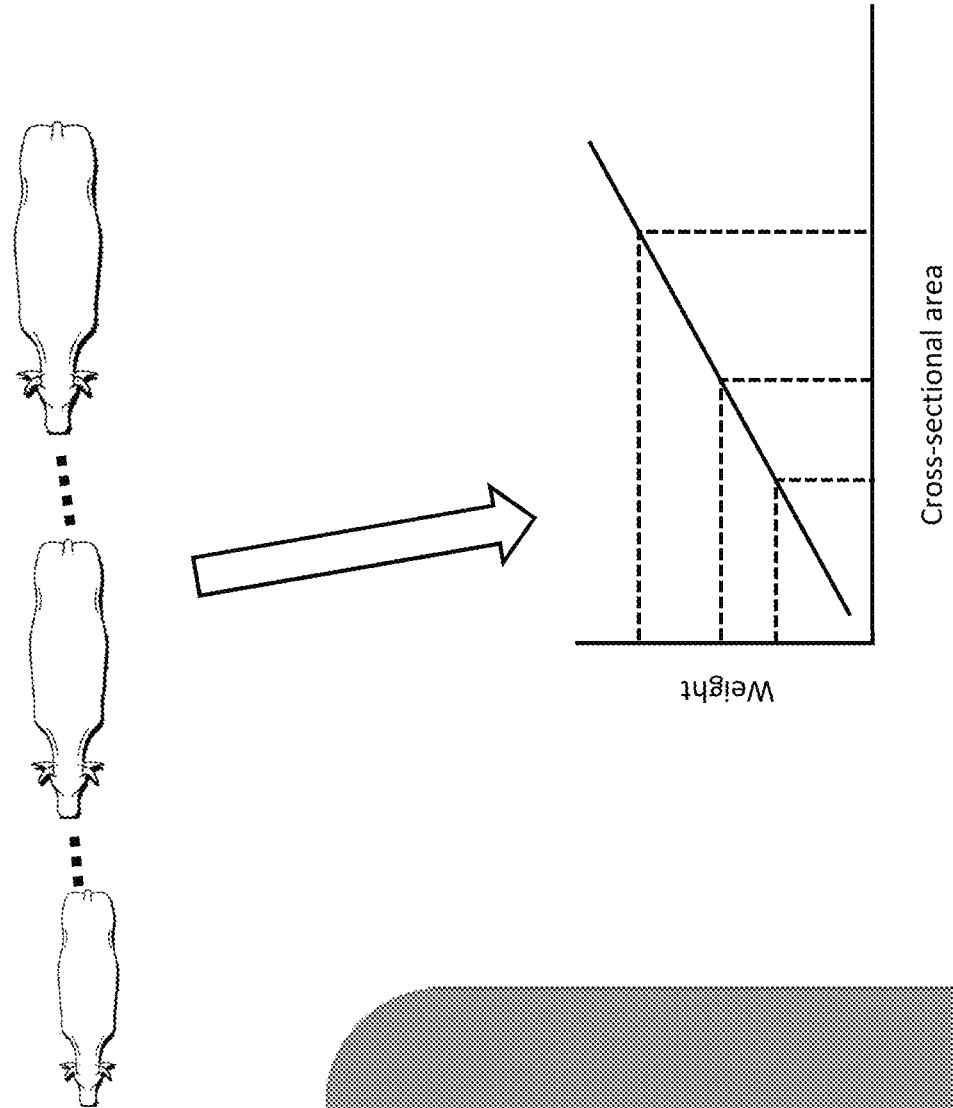
FIG. 8 is an illustration of an execution of the method of FIG. 5.

With reference to FIG. 8, an execution of the method of FIG. 5 can be accomplished in the particular embodiments of the present invention in which the imaging device(s) 130 are optical cameras. As shown in FIG. 8, the imaging devices 130 can be used to generate images of the livestock in the containment area 121 over time in which the images are indicative of the growth of each individual animal. This growth over time can be measured by the cross-sectional area of each individual animal that is determined from the images themselves or from comparisons between the images and either the fiducials 125 of the floor 124 (see FIGS. 1 and 2), the fiducials of the specialized lens 603 (see FIG. 6) or the fiducials 621 of the lens assembly 604 (see FIG. 6). The growth can then be correlated to each species of livestock in the containment area 121. An additional effort to weight a sample of individual animals of each species can be used with the measurements and determinations of growth over time to generate a single empirical weight vs. cross-sectional area calibration curve (referred to herein as a "calibration-curve") for each species of the livestock in the containment area 121.

In accordance with embodiments of the present embodiments, the developing of the calibration-curve and the generating of the images both rely upon the actuation and use of the imaging device(s) 130. As such, the positioning of the imaging device(s) 130 (i.e., distance from livestock, orientation/POV/FOV, etc.) and the zoom level of the imaging device(s) 130 can be known and either held constant or modified over time with the single calibration-curve for each species of the livestock in the containment area 121 being developed with respect to the known positioning and zoom level of the imaging device(s) 130.

In an exemplary case, an animal's cross-sectional area can be measured under different conditions than those of under which the single calibration-curve is or was created. That is delta(s) are estimated (control and measured) and an adjustment factor can be applied to a measured cross-sectional area. Therefore, if the single calibration-curve for a given species has been developed using a camera zoom of 2.0 and the current animal's cross-sectional area was made at a zoom setting of 2.5, then the animal's adjusted cross-sectional area is $((2.0/2.5)^2)*$Area (assuming x and y axes settings are equally scaled; x and y axes can be independently adjusted by knowing the adjustment factor between the axes).

With reference to FIG. 9, a barn 901 can be provided for use in supporting the livestock development gauging system 110 described above. The barn 901 includes multiple pens 910 that are each configured as described above and at least one imaging device 920 as described above for each of the multiple pens 910. Here, the processing system 930 is provided as described above and is configured to determine the livestock health measurement of the livestock based on the analysis of the images of the livestock of each of the multiple pens 910.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A livestock development gauging system, comprising:
a pen defining a livestock containment area;
an imaging device suspended above the livestock containment area and configured to generate images of livestock in the livestock containment area;
a processing system configured to determine a livestock health measurement of the livestock based on an analysis of the images of the livestock; and
a floor spanning at least a portion of the livestock containment area, wherein at least one of:
the floor is painted with a color that contrasts with a color of the livestock, and
the floor comprises fiducials configured to aid in the analysis of the images of the livestock.

2. The livestock development gauging system according to claim 1, further comprising a coupling to suspend the imaging device, the coupling being controllable to adjust at least one of a position and an orientation of the imaging device.

3. The livestock development gauging system according to claim 1, wherein the imaging device comprises at least one of:
a specialized lens into which fiducials configured to aid in the analysis of the images of the livestock are etched; and
a lens assembly comprising a lens, a calibration feature comprising fiducials and a fastener to fasten the calibration feature to the lens with the fiducials disposed in a field-of-view (FOV) of the lens.

4. A livestock development gauging system, comprising:
a pen defining a livestock containment area;
an imaging device suspended above the livestock containment area and configured to generate images of livestock in the livestock containment area; and
a processing system configured to determine a livestock health measurement of the livestock based on an analysis of the images of the livestock, wherein the processing system is configured to execute a method comprising:
developing a single calibration-curve for each species of the livestock;
generating the images of the livestock; and
determining the livestock health measurement for each individual of each species of the livestock by analyzing the images of the livestock using the single calibration-curve developed for that species.

5. The livestock development gauging system according to claim 4, wherein:
the single calibration-curve associates a weight of an animal with a cross-sectional area of the animal, and
the cross-sectional area of the animal is ascertained from the images of the livestock.

6. The livestock development gauging system according to claim 4, wherein the developing of the single calibration-curve and the generating of the images of the livestock respectively comprise maintaining a position, orientation and zoom of the imaging device as a constant for each species of the livestock.

7. The livestock development gauging system according to claim 5, wherein the generating of the images of the livestock comprises at least one of contrasting livestock coloring with floor coloring and comparing livestock physical characteristics with fiducials.

8. A barn for supporting the livestock development gauging system according to claim 1, the barn comprising:
multiple pens, each of the multiple pens being configured according to the pen of claim 1; and
at least one imaging device according to the imaging device of claim 1 for each of the multiple pens,
wherein the processing system is provided in accordance with the processing system of claim 1 and is configured to determine the livestock health measurement of the livestock based on the analysis of the images of the livestock of each of the multiple pens.

* * * * *